United States Patent [19]

Sato

[11] Patent Number: 5,202,968
[45] Date of Patent: Apr. 13, 1993

[54] EXPANSION SYSTEM

[75] Inventor: Kazuyuki Sato, Koganei, Japan

[73] Assignee: Kabushiki Kaisha Toshiba, Kawasaki, Japan

[21] Appl. No.: 758,358

[22] Filed: Sep. 10, 1991

Related U.S. Application Data

[63] Continuation of Ser. No. 330,697, Mar. 30, 1989, abandoned.

[30] Foreign Application Priority Data

Mar. 30, 1988 [JP] Japan ................................ 63-76939

[51] Int. Cl.⁵ ............................................ G06F 12/02
[52] U.S. Cl. ................................... 395/400; 395/425; 365/230.03; 364/243; 364/243.4; 364/243.41; 364/244; 364/244.2; 364/DIG. 1
[58] Field of Search ... 364/200 MS File, 900 MS File; 395/425, 400, 775, 250; 365/230.01, 230.03, 230.06; 340/798, 799

[56] References Cited

U.S. PATENT DOCUMENTS

| | | | |
|---|---|---|---|
| 4,296,467 | 10/1981 | Nibby, Jr. et al. | 364/200 |
| 4,432,067 | 2/1984 | Nielsen | 364/900 |
| 4,484,506 | 11/1984 | Sato | 84/1.01 |
| 4,534,257 | 8/1985 | Mitarai | 84/1.03 |
| 4,554,638 | 11/1985 | Iida | 364/521 |
| 4,609,996 | 9/1986 | Kummer | 364/900 |
| 4,707,802 | 11/1987 | Takahashi | 364/900 |
| 4,761,736 | 8/1988 | Di Orio | 364/200 |
| 4,884,270 | 11/1989 | Chiu et al. | 371/21.2 |

Primary Examiner—Michael R. Fleming
Assistant Examiner—Gopal C. Ray
Attorney, Agent, or Firm—Oblon, Spivak, McClelland, Maier & Neustadt

[57] ABSTRACT

A cache LSI has an expansion pin which is set to "0" (GND) level or "1" (Vcc) level. A portion of a SET field of a cache directory is used as a field for selecting a cache LSI. Each cache LSI includes a determination circuit. The determination circuit performs a predetermined logical operation based on a level signal set at the expansion pin and a level signal of the cache selection field in the SET field, and determines whether or not an intra-chip is selected.

5 Claims, 4 Drawing Sheets

| EP2 | EP1/SL1 | SL0 | CONFIGURATION | |
|---|---|---|---|---|
| 0 | 0 | 0 | B | BASIC |
| 0 | 0 | 1 | B | |
| 0 | 1 | 0 | EP1/L | EXPANSION 1 |
| 0 | 1 | 1 | EP1/H | |
| 1 | 0 | 0 | EP2/LST | EXPANSION 2 |
| 1 | 0 | 1 | EP2/L | |
| 1 | 1 | 0 | EP2/H | |
| 1 | 1 | 1 | EP2/HST | |

F I G. 3

EXPANSION SYSTEM

This application is a continuation of application Ser. No. 07/330,697, filed on Mar. 30, 1989, now abandoned.

BACKGROUND OF THE INVENTION

1. Field of the Invention

The present invention relates to an expansion system suitable for expanding, e.g., a cache memory system.

2. Description of the Related Art

Along with the rapid development of LSI techniques, a high-performance cache memory LSIs (to be referred to as cache LSIs hereinafter) which are integrated at high density and have high operation speed are available. Of these cache LSIs, one or both of a cache directory portion and a cache data portion are realized by LSIs. The capacity of a normal cache memory system varies depending on the scale or performance of a computer system. Therefore, a cache memory system is constituted by a necessary number of cache LSIs. Each cache LSI has a chip select terminal. A cache LSI which receives a chip select signal at its chip select terminal is accessed by a microprocessor ($\mu$ processor) The chip select signal is generated by a decoder externally attached to the cache memory system. More specifically, as shown in FIG. 1, $\mu$ processor 11 is connected to address decoder 13 through address bus 17. $\mu$ processor 11 is also connected to cache LSIs 15a, 15b, 15c, and 15d through address bus 17, data bus 19, and control bus 21. An address for accessing one of cache LSIs output from $\mu$ processor 11 is supplied to address decoder 13. Address decoder 13 decodes this address, and enables one of a plurality of chip select signal lines 23. As a result, $\mu$ processor 11 performs a read/write access with respect to the cache LSI to which the enable chip select signal is supplied. A case wherein a system is expanded using a plurality of identical chips in this manner is described in, e.g., "The McGraw-Hill Computer Handbook" (1983), subtitle "7-6 Connecting Memory Chips to A Computer Bus" pp. 7-16 through 7-21.

In this manner, when a memory system is expanded using a plurality of cache LSIs, address decoder 13 and a plurality of chip select signal lines 23 must be arranged. For this reason, the hardware scale is increased, and disturbs integration of a system LSI. A signal delay occurs due to address decoder 13 and chip select signal lines 23. For this reason, a signal delay amount of a cache LSI when a single cache LSI is used is different from that when a plurality of cache LSIs are used, and it is disadvantageous for performance of the system.

SUMMARY OF THE INVENTION

It is an object of the present invention to provide an expansion system which, when a system is expanded using a plurality of identical LSIs, requires no hardware arrangement to be externally attached and causes no signal delay.

In order to achieve the above object, an expansion system of the present invention comprises: means for supplying an address; a plurality of LSI semiconductor devices, connected to said address supplying means, each including at least one expansion pin which is set to a predetermined level; means for performing a logical operation of the address data and the level of the expansion pin; and means for determining whether intra-LSI semiconductor device is selected in accordance with a result from said logical operation performing means.

BRIEF DESCRIPTION OF THE DRAWINGS

FIG. 3 is a table showing level assignment of expansion pins provided to cache LSIs in the embodiment shown in FIG. 2;

DETAILED DESCRIPTION OF THE PREFERRED EMBODIMENTS

Figure 1:
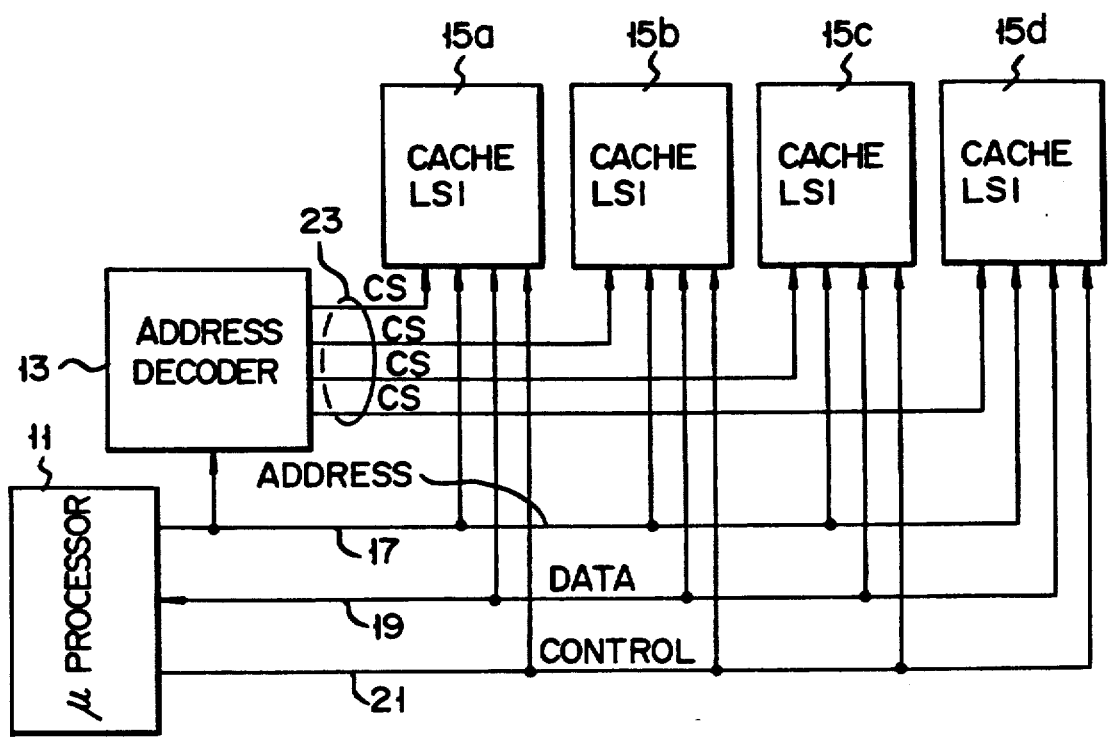
FIG. 1 is a block diagram showing an arrangement of a conventional cache memory system.
Figure 2:
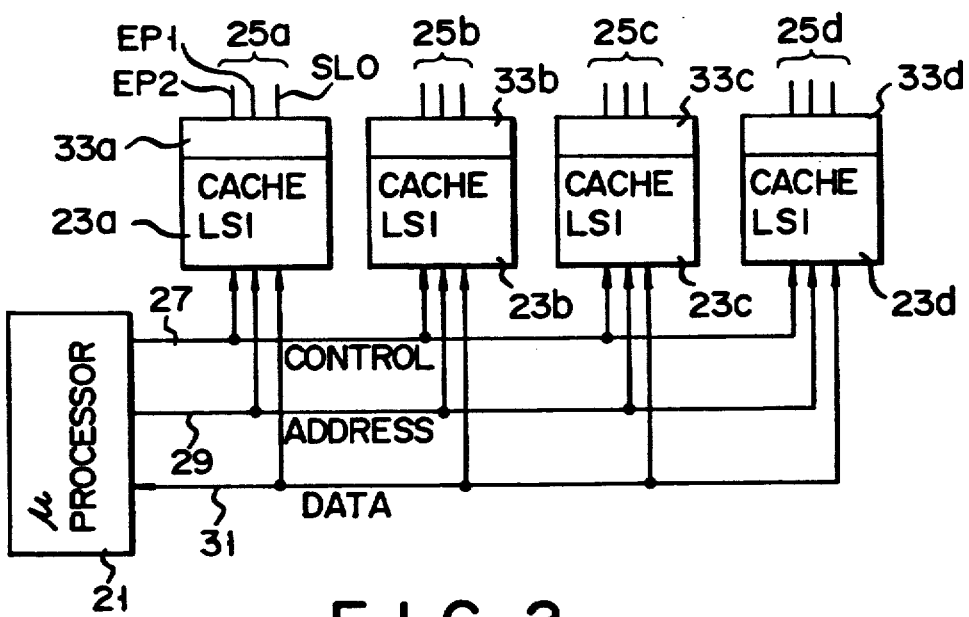
FIG. 2 is a block diagram showing an arrangement of an expansion system of the present invention.

FIG. 2 is a block diagram showing a cache memory system to which an expansion system of the present invention is applied. $\mu$ processor 21 is connected to a plurality of cache LSIs 23a, 23b, 23c, and 23d through control bus 27, address bus 29, and data bus 31. Cache LSIs 23a, 23b, 23c, and 23d respectively have expansion input pins 25a, 25b, 25c, and 25d, and determination circuits 33a, 33b, 33c, and 33d for determining whether or not the corresponding cache LSIs are selected. The number of expansion input pins is three in this embodiment, but can be appropriately determined depending on a scale to be expanded. For the sake of illustrative simplicity, other pins, such as address pins, data pins, and the like are omitted. Expansion pins 25a, 25b, 25c, and 25d are set to GND or Vcc level in accordance with a scale to be expanded.

FIG. 3 shows the relationship between the number of cache LSIs 23a, 23b, 23c, and 23d, and setting of levels of expansion pins 25a, 25b, 25c, and 25d. FIG. 3 summarizes setting of GND and Vcc levels when a cache memory system is configured by using one, two, and four cache LSIs, respectively. In a basic configuration using one cache LSI (BASIC), since no expansion is made, both "expansion 2 and expansion 1", or EP2 and EP1, pins are set to "0", i.e., GND level. A select bit O or, SLO pin is set to a "don't care" level, i.e., can be set to either "0" (GND) or "1" (Vcc). When two cache LSIs are used (Expansion 2), EP2 pins of cache LSIs 23a, 23b, 23c, and 23d are set to "0" (GND level) and their EP1 pins are set to "1" (Vcc level). The SLO pin of an L (Low) side, e.g., a cache LSI farther from $\mu$ processor 21 (e.g., when two cache LSIs 23a and 23b are used, 23b) is set to "0" (GND level), and the SLO pin of an H (High) side, i.e., a cache LSI closer to $\mu$ processor 21 (e.g., cache LSI 23a) is set to "1" (Vcc level). Furthermore, when four cache LSIs 23a, 23b, 23c, and 23d are used, their EP2 pins are set to "1" level, and combinations of their EP1 and SLO pins are set to "00", "01", "10", and "11" in the order starting from cache LSI 23d farthest from $\mu$ processor 21 to closest cache LSI 23a. Note that in FIG. 3, the cache LSIs are indicated by symbols "LST", "L", "H", and "HST" in the order starting from the cache LSI farthest from $\mu$ processor 21 to the closest cache LSI.

Figure 4:
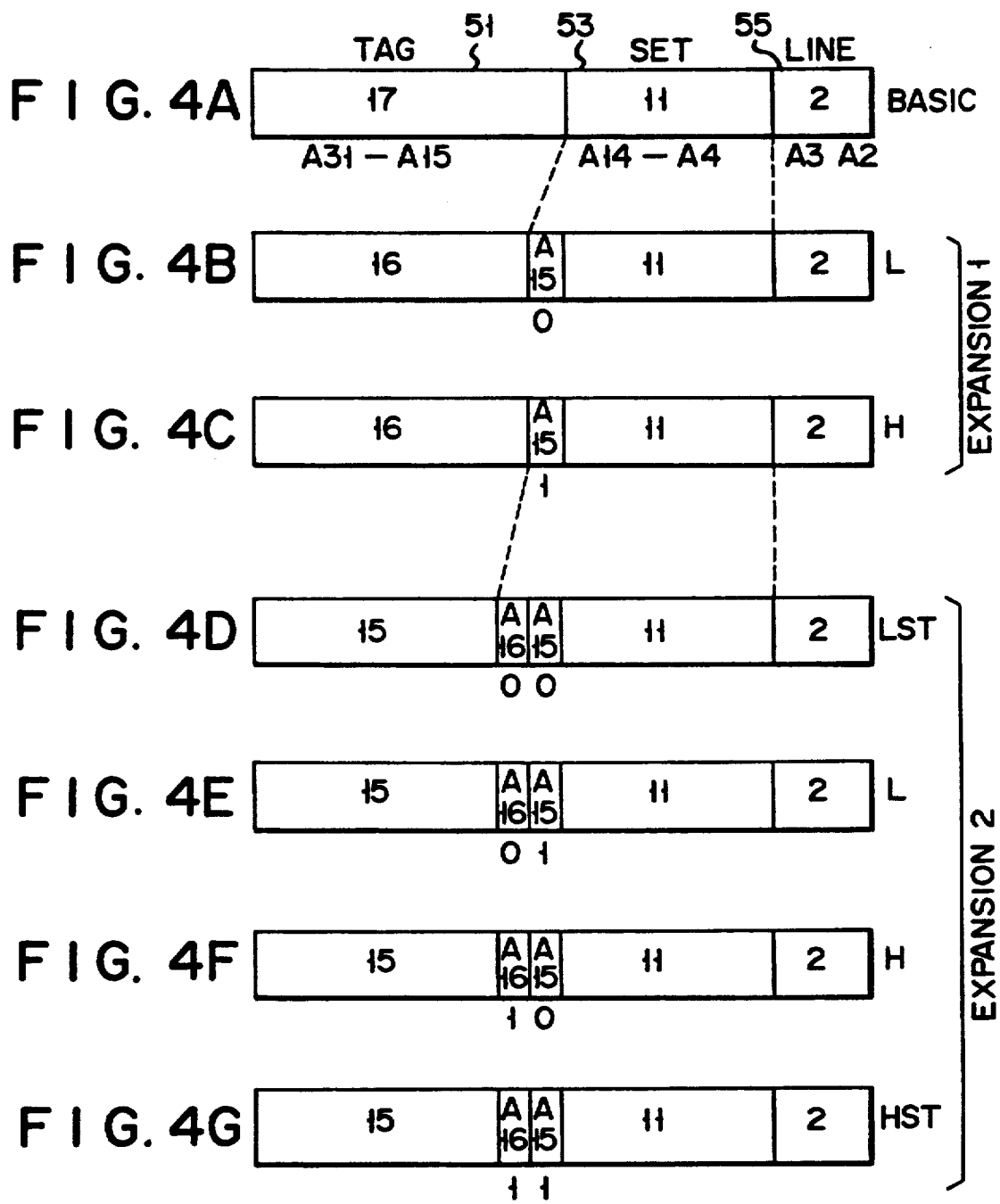
FIGS. 4A through 4G show formats of cache directories when the number of cache LSIs is one, two, and four, respectively.

Cache LSIs 23a, 23b, 23c, and 23d are selected by setting EP2, EP1, and SLO pins to GND or Vcc level and setting SET addresses in their cache directories. Each cache directory is configured by TAG field 51, SET field 53, and LINE field 55, as shown in FIGS. 4A through 4G. TAG is the address information held in the cache directory. Since many addresses map to a single block, the tag information is used to identify the exact memory location that is currently associated with the block. A BLOCK is the basic unit of cache addressing (the entries in the cache directory refer to blocks). A SET is a grouping of blocks consisting of one address block from each "way". All blocks in a set are simultaneously selected when a portion of the bus address is decoded into a SET address. A LINE is the basic unit of data transferred between the cache and main memory. As shown in FIG. 4A, when a cache memory system is configured by a single cache LSI, LINE field 55 is constituted by two bits, i.e., A2 and A3, SET field 53 is constituted by 11 bits, i.e., A4 through A14, and TAG field 51 is constituted by 17 bits, i.e., A15 through A31. When two cache LSIs (e.g., 23a and 23b) are used, bits A4 through A15 are assigned to SET field 53, and are used for selecting the cache LSIs, as shown in FIGS. 4B and 4C. When bit A15 is "0", cache LSI 23b farther from μ processor 21 is selected, and when it is "1", cache LSI 23a closer to μ processor 21 is selected. FIGS. 4C through 4G show formats of directories when four cache LSIs (23a, 23b, 23c, and 23d) are used. In this case, bits A4 through A16 are assigned to SET field 53, and are used for selecting the cache LSIs. When cache LSI 23d farthest from μ processor 21 is selected, two bits A15 and A16 are set to "00". When second farthest cache LSI 23c is selected, bits A15 and A16 are set to "1". When second closest cache LSI 23b is selected, bits A15 and A16 are set to "01". When closest cache LSI 23a is selected, bits A15 and A16 are set to "11".

Based on the content of SET field 53 and levels of the EP2, EP1, and SLO pins and using internal determination circuits 17, cache LSIs 23a, 23b, 23c, and 23d determine whether or not intra-cache LSIs are designated. A logical expression used for the above determination is as follows:

$$CS = \overline{EP2} \cdot \overline{EP1} + \overline{EP2} \cdot EP1 \cdot \overline{SLO} \cdot \overline{A15} + \overline{EP2} \cdot$$

$$EP1 \cdot SLO \cdot A15 + EP2 \cdot \overline{EP1} \cdot \overline{SLO} \cdot \overline{A16} \cdot \overline{A15} + EP2 \cdot$$

$$\overline{EP1} \cdot SLO \cdot \overline{A16} \cdot A15 + EP2 + EP1 \cdot \overline{SLO} \cdot A16 \cdot \overline{A15} +$$

$$EP2 \cdot EP1 \cdot SLO \cdot A16 \cdot A15$$

Figure 5:
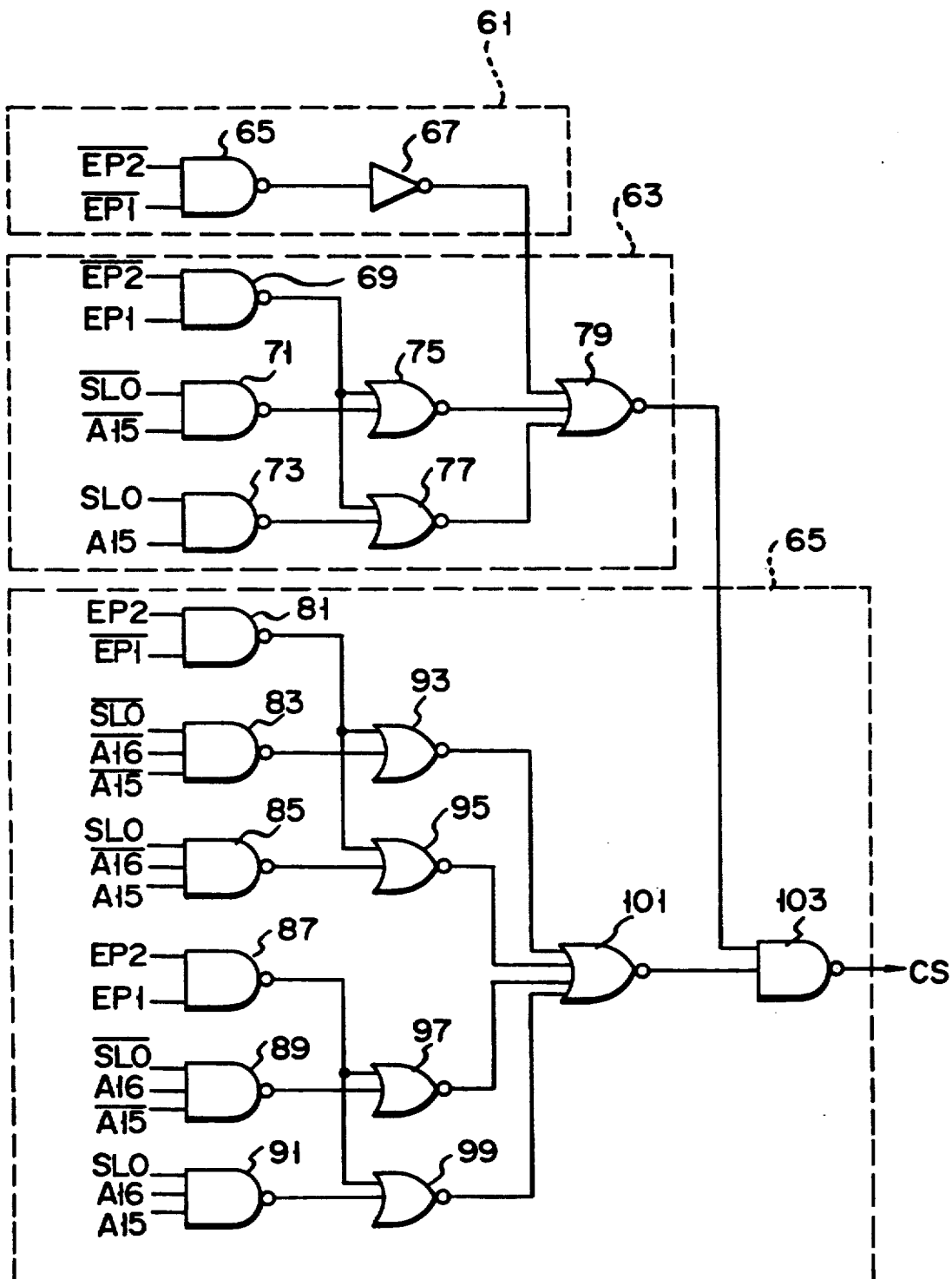
FIG. 5 is a circuit diagram showing in detail a determination circuit in the expansion system of the present invention.

Note that the above expression exemplifies a case wherein selection from up to four cache LSIs is performed. When selection from more than four cache LSIs is performed, the logical expression can be similarly formed. In this logical expression, when one cache LSI is used, a chip select signal (CS) is determined by logical expression "$\overline{EP2} \cdot \overline{EP1}$". When two cache LSIs are used, a CS signal is determined by logical expression "$\overline{EP2} \cdot EP1 \cdot \overline{SLO} \cdot \overline{A15} + \overline{EP2} \cdot EP1 \cdot SLO \cdot A15$". When four cache LSIs are used, the CS signal is determined by logical expression "$EP2 \cdot \overline{EP1} \cdot \overline{SLO} \cdot \overline{A16} \cdot \overline{A15} + EP2 \cdot \overline{EP1} \cdot SLO \cdot \overline{A16} \cdot A15 + EP2 \cdot EP1 \cdot \overline{SLO} \cdot A16 \cdot \overline{A15} + EP2 \cdot EP1 \cdot SLO \cdot A16 \cdot A15$". FIG. 5 shows a detailed circuit arrangement of determination circuits 33a, 33b, 33c, and 33d for calculating the above-mentioned logical expression. In FIG. 5, a block indicated by broken line 61 is constituted by NAND gate 65 and inverter 67, and is a circuit for calculating EP2·EP1 when one cache LSI is used. A block indicated by broken line 63 is constituted by NAND gates 69, 71, and 73, and NOR gates 75, 77, and 79, and is a circuit for calculating "$\overline{EP2} \cdot EP1 \cdot \overline{SLO} \cdot \overline{A15} + \overline{EP2} \cdot EP1 \cdot SLO \cdot A15$" when two cache LSIs are used. Furthermore, a block indicated by broken line 65 is constituted by NAND gates 81, 83, 85, 87, 89, and 91, NOR gates 93, 95, 97, 99, and 101, and NAND gate 103, and is a circuit for calculating "$EP2 \cdot \overline{EP1} \cdot \overline{SLO} \cdot \overline{A16} \cdot \overline{A15} + EP2 \cdot \overline{EP1} \cdot SLO \cdot \overline{A16} \cdot A15 + EP2 \cdot EP1 \cdot \overline{SLO} \cdot A16 \cdot \overline{A15} + EP2 \cdot EP1 \cdot SLO \cdot A16 \cdot A15$" when four cache LSIs are used.

The operation of the expansion system of the present invention with the above arrangement will now be described. First, selection when a cache memory system is constituted by one cache LSI (e.g., 23a) will be described below.

In this case, the EP2 and EP1 pins of cache LSI 23a are set to "0", i.e., GND level, and the SLO pin is set to either "0" or "1". As a result, "1" signals are input to the first and second input terminals of NAND gate 65 of block 61. NAND gate 65 then outputs data "0", and data "0" is inverted to data "1" by inverter 67. Then, data "1" is converted to "0" by NOR gate 79, and is supplied to NAND gate 103. Finally, a "1" CS signal is obtained. As a result, cache LSI 23a determines that the intra-LSI is selected.

When two cache LSIs (e.g., 23a and 23b) are used, selection is made as follows.

Assume that cache LSI 23b farther from μ processor 21 of two cache LSIs 23a and 23b is to be selected. Of expansion pins 25b of cache LSI 23b, as shown in FIG. 3, the EP2 pin is set to "0", the EP1 pin is set to "1", and the SLO pin is set to "0". In the SET field, bit A15 is set to "0", as shown in FIG. 4B. As a result, "1" signals are supplied to both the input terminals of NAND gate 71, and "0" signals are input to both the input terminals of NAND gate 73. As a result, "0,0" signals are input to NOR gate 75, and "0,1" signals are input to NOR gate 77. NOR gates 75 and 77 respectively supply "1" and "0" signals to NOR gate 79. NOR gate 79 supplies a "0" signal to NAND gate 103. As a result, NAND gate 103 outputs a "1" CS signal. As a result, cache LSI 23b determines that the intra-LSI is selected. Selection when four cache LSIs 23a, 23b, 23c, and 23d are used will be described below.

For the sake of descriptive simplicity, a case will be explained wherein cache LSI 23a closest to μ processor 21 is to be selected.

In this case, the EP2, EP1, and SLO pins of expansion pins 25a of cache LSI 23a closest to μ processor 21 are set to "1", as shown in FIG. 3. In this case, in the SET field, both bits A15 and A16 are set to "1", as shown in FIG. 4G. As a result, "1,0" signals are supplied to NAND gate 81; "0,0,0" signals, NAND gate 83; "1,0,1" signals, NAND gate 85; "1,1" signals, NAND gate 87; "0,1,0" signals, NAND gate 89; and "1,1,1" signals, NAND gate 91. As a result, the outputs from NAND gates 81, 83, 85, 87, 89, and 91 are respectively "1", "1", "1", "0", "1", and "0". "1,1" signals are supplied to NOR gate 93; "1,1" signals, NOR gate 95; "0,1" signals, NOR gate 97; and "0,0" signals, NOR gate 99. As a result, the outputs from NOR gates 93, 95, 97, and 99 are respectively "0", "0", "0", and "1". Therefore, "0,0,0,1" signals are supplied to NOR gate 101. NOR gate 101 outputs "0". The output "0" is supplied to NAND gate 103. Gate 103 then outputs a "1" CS signal. As a result, the cache LSI closest to μ processor 21 determines that the intra-LSI is selected. Selection of other chips is made in the same manner as described above.

Note that the present invention is not limited to the above embodiment.

For example, the present invention can be applied to a case wherein signal delay deteriorates system performance or a hardware arrangement is not externally attached in a system which is expanded using a plurality of identical LSIs.

What is claimed is:

1. A LSI semiconductor device selecting system, comprising:
    means for supplying an address to access a plurality of LSI semiconductor devices;
    a plurality of LSI semiconductor devices, connected to said address supplying means, each including:
    at least one expansion pin which is set to a predetermined static level, the expansion pin specifying the number of LSI semiconductor devices and LSI-selection-data in the address; and
    means, connected to said address supplying means and said pins, for performing a logical operation in accordance with contents of the address and the level of the expansion pin;
    means, connected to the performing means and the supplying means, for determining whether an LSI semiconductor device is selected in accordance with a result from said logical operation performing means.

2. A memory system which avoids selecting signal delays due to alternative selection of memory devices, comprising:
    at least one memory device including, means for receiving an address having logical information, and at least one expansion pin, each expansion pin set at a respective logical level;
    means for configuring the memory system by specifying the number of memory devices and memory-device-selection-data in the address by using the expansion pin; and
    wherein each memory device includes a means, coupled to the address receiving means and at the least one expansion pin, for performing a logical operation on the logical information of the memory-device-selection-data and the logical level of the at least one expansion pin to determine whether said memory device is being selected for a memory access operation, and said memory access operation is performed by said at least one memory device upon determination that said at least one memory device has been selected.

3. A system according to claim 2, wherein the expansion pins is set to either a ground level (logic "0" level) or a power source voltage level (logic "1" level).

4. A system according to claim 2, wherein each of the memory devices is a cache LSI semiconductor device.

5. A system according to claim 4, wherein a cache directory for the cache LSI semiconductor devices includes a SET address field for designating grouped blocks, and said means for receiving which supplies the SET address.

* * * * *